Sept. 19, 1967     M. F. TEPNER     3,342,056
COMPRESSION TOOL
Original Filed June 17, 1963
2 Sheets-Sheet 1
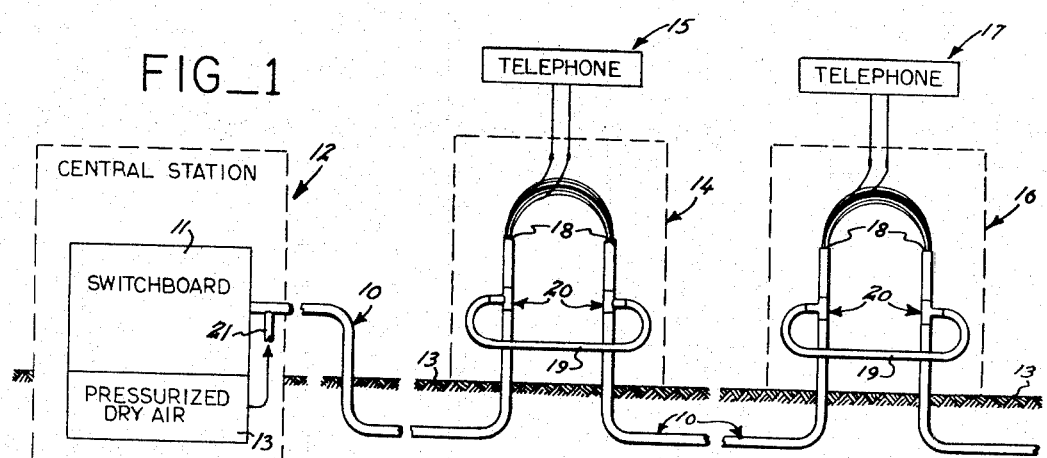
FIG_1
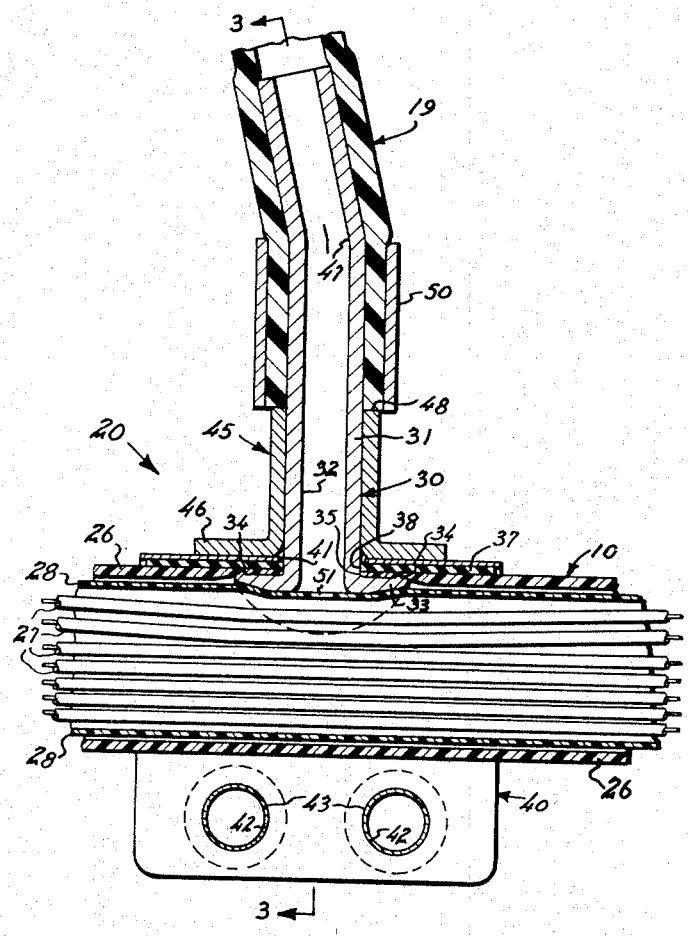
FIG_2
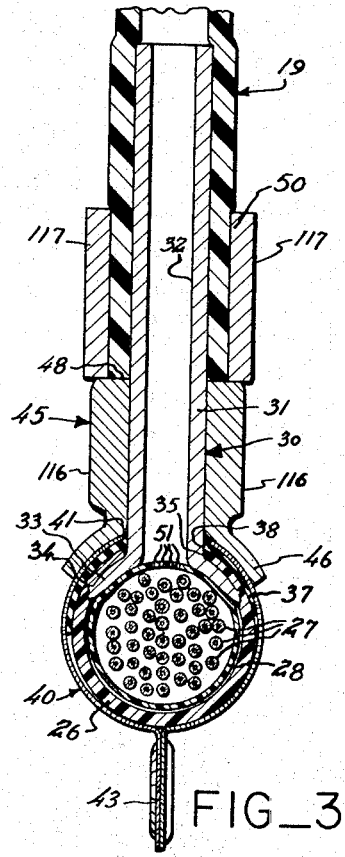
FIG_3
INVENTOR.
MARVIN F. TEPNER
BY
Mellin, Moore & Weissenberger
ATTORNEYS

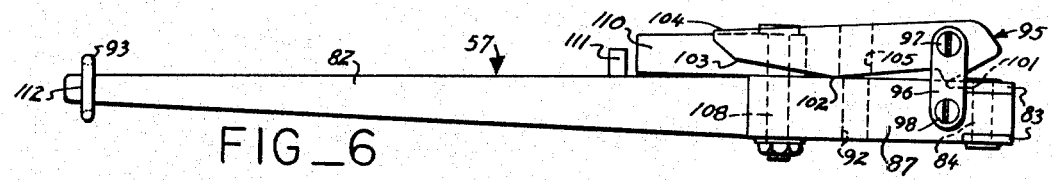

3,342,056
COMPRESSION TOOL
Marvin F. Tepner, Plainview, Nebr. 68769
Original application June 17, 1963, Ser. No. 288,121, now Patent No. 3,235,651, dated Feb. 15, 1966. Divided and this application June 21, 1965, Ser. No. 465,468
4 Claims. (Cl. 72—316)

This application is a division of my copending United States patent application Ser. No. 288,121, filed June 17, 1963, now Patent No. 3,235,651, granted Feb. 15, 1966.

This invention relates to improvements in making branch connections to plastic conduits, and more specifically to a compression tool for use in installing a pressure bypass connection to a plastic-sheathed telephone cable to enable the conduit to be pressurized.

It has long been realized that gas pressurization of telephone cables is highly desirable to protect such cables against shorting caused by moisture leaking into the cable. Normally, dry gas under a pressure of 5–10 p.s.i. is introduced into a cable to place the cable at a higher internal pressure than ambient to prevent the entry of moisture through any cracks or openings in the cable sheath or casing that may exist.

In a typical telephone system the gas is introduced into the cables at the central station of the system. The cables extend from the central station to all of the telephones serviced by the system. At intervals the cable is brought to a pedestal and the casing is stripped from a section of the cable to expose the telephone wires so that service connections may be made thereto. The cable casing is sealed at each end of the exposed section in order to make the cable pressure tight. In order to maintain the entire cable at a superatmospheric pressure, a pressure bypass connection must then be made to the sealed ends of the cable casing in the pedestal to bypass the exposed section so that the pressurized gas can flow from the central station through the entire cased portion of the cable.

The great bulk of telephone installations in this country utilize lead-sheathed cable, and various means have been devised to connect the bypass connections to the lead sheaths of the cables so that the cable systems could be pressurized. Developments in recent years have introduced different variations in cable construction; for example, paper-insulated conductors in plastic-sheathed cables and plastic-insulated conductors encased in plastic-sheathed cables. It has been desired to use these plastic-sheathed cables in a pressurized system, but the major difficulty has been that, in spite of various attempts, no way has been devised to make satisfactory field installations of the necessary pressure bypass connections to the relatively thin plastic sheaths of such cables.

It is the primary object of this invention to provide a compression tool for use in making pressure bypass connections to plastic-sheathed telephone cables.

A further object is to provide a compression tool for making bypass connections for plastic-sheathed telephone cables so that the connection can be made without the use of heat or solvents which might be deleterious to the cable, and without decreasing the strength of the cable.

Other objects and advantages will become apparent in the course of the following detailed description.

In the drawings forming a part of this application, and in which like parts are designated by like reference numerals throughout the same, FIG. 1 is a generally schematic illustration of a telephone system utilizing the pressure bypass connection of the invention.

FIG. 2 is a longitudinal sectional view of a portion of a telephone cable and a connection thereto made with the use of a tool embodying the principles of the invention, in which the thickness of various portions of the telephone cable have been exaggerated for purposes of illustration.

FIG. 3 is a section view of the telephone cable and connection taken on line 3—3 of FIG. 2.

FIG. 4 is a top view of the compression tool used in making the bypass connection.

FIG. 5 is a sectional view of the tool illustrated in FIG. 4, taken on line 5—5 thereof.

FIGS. 6 and 7 are side views of the tool illustrated in FIG. 4, showing the operating positions of the compression member of the tool.

Referring now to the drawings, wherein is illustrated a preferred embodiment of the invention, FIG. 1 shows a typical telephone installation utilizing the pressure bypass connections of the invention. A plastic-sheathed telephone cable 10 is connected to the switchboard 11 at the central station 12 and extends from the station under the ground 13 to a pedestal 14. The cable is brought up into the pedestal, and the cable sheath or casing is stripped away to expose the telephone wires in the cable so that the proper pair can be connected to a telephone 15. The cable 10 then extends underground to the next pedestal 16, wherein the telephone wires are again exposed so that a service connection can be made to telephone 17. The cable 10, of course, then extends to all of the other telephones serviced by the cable.

In each pedestal, the exposed ends of the cable sheath are sealed in a well-known manner at 18, by epoxy resin or the like, to prevent moisture from entering the sheathed portions of the cable. As will be apparent, the cable 10 is thus comprised of a series of sheathed portions extending between the central station and the succeeding pedestals.

The sealed ends of the cables are placed in internal pressure communication in each pedestal by means of the tubings 19, which connect to the bypass inserts, generally shown at 20, secured to the plastic sheath of the cable.

A tap connection 21 to the cable is provided at the central station to enable pressurized gas from source 13 to be introduced into the interior of cable 10. The pressure of this gas will be communicated through the interstices between the telephone wires in the cable and through the bypass tubings 19 to pressurize the entire system. Once pressurized, there will be no gas flow through the cable, but a static pressure will exist therein. Even if one or more small pin-point leaks in the cable should exist, the minimal flow of gas therefrom would not be sufficient to cause the system to lose its protective pressure as long as the source 13 supplies sufficient make-up pressure.

*The bypass connection*

The construction of the cable 10 is best shown in FIGS. 2 and 3. As will be seen, the cable 10 is a standard telephone cable, and comprises an outer resilient plastic sheath or casing 26. A plurality of insulated telephone conductors 27 are carried within the casing 26 and are all wrapped together in a tough plastic film 28, typically Mylar. The diameter of the casing 26 is determined by the number of telephone conductors carried by the cable. For a 25-pair cable, the outer diameter of the casing is in the order of one-half inch and the casing thickness is in the order of 1/16 inch.

The bypass inserts 20 comprise a core member 30, shown in FIGS. 2 and 3, having an elongated shank 31 provided with a flow passage 32 therethrough and formed with an enlarged flange 33 at one end thereof. This flange is curved, with a radius of curvature essentially equal to the radius of curvature of the inner surface of the casing 26. A small rib 34 is formed on and around the upper surface of the flange adjacent the edge thereof. The core member is preferably formed from a suitable copper alloy. The flange of the core member sits between the plastic film 28 and the casing 26 with the upper surface of the flange in full contact with the inner surface of the casing. The shank 31 extends outwardly from the casing through a hole 35 in the casing.

A deformable packing member 37, shown in FIGS. 2 and 3, is preferably of rectangular shape with a central hole 38 therethrough to enable the packing member to fit onto the shank 31 of the core member and be in contact with the outer surface of casing 26. The packing member 37 may be of rubber, plastic, leather, or the like.

A generally rectangular retaining band 40, preferably formed from a suitable copper alloy, is provided with a central hole 41, for the reception of shank 31 of the core member 30, and end holes 42. The retaining band extends circumferentially around the casing 26, and is tightly secured in place by rivets 43. This band serves to restrain any circumferential expansion of the cable in the vicinity of the bypass connection when the system is pressurized.

An outer tubular member 45 is telescoped onto the shank 31 of the core member 30, and has an enlarged-diameter flange 46 on one end thereof. The flange 46 is curved so that the lower surface of the flange conforms to the curvature of the outer surface of the casing 26. The member 45 is preferably formed from a suitable copper alloy.

As best seen in FIG. 2, the upper end of shank 31 of the core member 30 projects from the outer member 45 and is bent at 47 at a point spaced from the upper shoulder 48 of the outer member. The resilient plastic bypass tubing 19 is telescoped onto the exposed end of the shank 31 and is stopped by the upper shoulder 48 of the outer member. The tubing 19 is held in place by a retaining ring 50 which is disposed about the tubing and located between the outer member 45 and the bend 47 in the shank 31.

The plastic film 28 is perforated at 51 adjacent the passage 32 through the core member 30 so that the bypass tubing 19 is in pressure communication with the interstices between the telephone wires 27.

*Compression tool 57*

The compression tool 57, illustrated in FIGS. 4–7, comprises a pair of elongated handle members 81 and 82 pivotally joined together at their ends by links 83 and pins 84. Both handles have head portions adjacent the pivotally connected ends of the handles provided with top surfaces 86 and 87 and side surfaces 88 and 89, respectively.

The side surface 88 of handle 81 has a semi-circular groove 91 formed therein extending from the top surface 86, and a similar groove 92 is formed on handle 82. These grooves are knurled or otherwise roughened, and when the handles 81 and 82 are closed together the grooves form a circular hole of slightly smaller diameter than the diameter of the shank 31 of the core member 30 so that the shank can be securely gripped by the tool 57.

Handle 81 carries a locking ring 93 at the end thereof which is adapted to encompass the adjacent end of handle 82, as seen in FIG. 6, to lock the handles in closed position.

An elongated compression member 95 is disposed on the top surface 87 of handle 82, and is held in place thereon by link 96 and screws 97 and 98, which connect to the compression member and handle, respectively. The holes in link 96 which accommodate screws 97 and 98 are slightly oversize to provide sufficient lost motion to enable the compression member 95 to rock on the handle 82.

As best seen in FIG. 6, the compression member 95 has a transverse shoulder 101 adjacent one end thereof which rests on the upper surface 87 of handle 82. The other end of the compression member has a portion 102 on the lower surface thereof normally resting on the upper surface 87 of handle 82, and is provided with an upwardly extending cam surface 103 extending generally from 102 towards the upper surface 104 of the compression member.

Intermediate the ends thereof, the compression member 95 is provided with a hole 105 therethrough of slightly larger diameter than that of the shank 31 of the core member. When the compression member contacts the upper surface 87 of the handle 82, hole 105 is in axial alignment with the hole formed by grooves 91 and 92 when the handles are closed.

A lever arm 107 is pivotally connected by bolt 108 to the upper surface 86 of handle 81, and has a handle portion 109 formed on one end and a sloping wedge surface 110 formed on the other end thereof. When the handles 81 and 82 are closed together, counterclockwise rotation of lever arm 107 will force the wedge surface 110 thereof between the upper surface 87 of handle 82 and the cam surface 103 of the compression member 95 to rock the compression member in a clockwise direction about its shoulder 101, as shown in FIG. 7. An upwardly extending stop member 111 on handle 81 is provided to engage handle 109 and limit counterclockwise rotation of the lever arm.

When the compression member 95 has been rocked to its position shown in FIG. 7, it will be noted that the axis of compression member hole 105 is inclined at an angle to the axis of the hole formed by grooves 91 and 92.

*Method of installation of a bypass insert*

To install a bypass insert in a telephone cable in accordance with the invention, the hole 35 in the casing is first made, by use of a casing cutter. The casing is then temporarily stretched within the plastic "memory" of the casing adjacent the hole to enlarge a diameter of the hole so that the enlarged-diameter flange 33 of the core member 30 can be inserted through the hole 35. The plastic material used in the casing 26 can be temporarily stretched, but the inherent memory of the material will cause it to creep back gradually to resume its original unstretched shape. Several punctures 51 are made in the plastic film 28 to ensure adequate pressure communication between the interior of film 28 and the casing 26. If desired, this step can be performed before the last-described step of stretching the casing.

The flange 33 of the core member is then worked through the temporarily stretched hole 35, leaving the shank 31 projecting from the hole. The shank 31 is positioned so that the curved flange 33 is in full surface contact with the inner surface of the casing, i.e., with the axis of the curvature of flange 33 being coaxial to cable 10. Although this position is easy to determine by feel, an index mark could be made on the shank 31 to indicate the position of the flange 33. The mechanical pressure between the conductors and the cable casing will then hold the core member in proper position to permit the following steps to be made.

In the event that a different-size cable is to be worked upon, a different core member 30 will be used having a flange curvature equal to the inner curvature of the casing.

The packing member 37 is then put into place in contact with the outer surface of the casing, with the shank 31 projecting through the packing hole 38.

The retaining band 40 is then wrapped around the casing and the ends thereof are secured by rivets 43 to grip the casing tightly.

The outer member 45 is then telescoped onto the shank 31 and is positioned on the retaining band so that the curved lower surface of the flange 46 is in full contact with the retaining band. The curved flanges of the outer member 45 and the core member 30 will now be in parallelism. It is of course to be appreciated that if a different core member is used on a different sized cable, a different outer member having a correspondingly different curvature of its flange will be used. The normal inner diameter of the member 45 is just slightly greater than that of shank 31 so that the member 45 fits easily thereon.

By this time, the memory of the plastic casing will have caused the casing to return from its temporarily stretched condition to its original shape and the casing will be in contact with the shank 31 completely therearound.

The compression tool 57 is now used. The lever arm 107 is rotated so that the wedging surface 110 thereof is out of the way of the compression member 95. The handles 81 and 82 are opened, and the tool is manipulated so that the shank 31 extends through the compression member hole 105 and the upper surface 104 of the compression member 95 abuts the end 48 of the outer member. Handles 81 and 82 are then closed to grip the end of shank 31 by the roughened grooves 91 and 92. The locking ring 93 is slipped over the end of handle 82 and into groove 112 to lock the handles together.

With the handles held still, the lever arm 107 is then rotated into engagement with the stop member 111 to move the wedging surface 110 thereon into engagement with the cam surface 103 of the compression member to force the compression member away from the handle 82. Since the shank 31 is gripped by handles 81 and 82, and since the outer member 45 is abutted by the upper surface of compression member 95, the shank and outer members will be forced in opposite directions to force the flanges thereon together. The casing 26 will thus be very tightly gripped between the flanges 33 and 46. A very effective seal is formed both by the high compressive pressure between the flanges and by means of the rib 34 on the upper surface of flange 33 which embeds itself into the casing wall. Additionally, the compressive force between the flanges will cause the deformable packing member 37 to flow somewhat towards the core member and into effective sealing engagement between the core member and the outer member 45.

Although it is preferable to use the deformable packing member 37 for maximum sealing, effective sealing can still be obtained if this element is omitted. The plastic casing 26 itself is deformable and the compression of the casing between the flanges 33 and 46 will cause the casing to deform therebetween, tending to reduce the diameter of the casing hole 35 so that the casing flows into sealing contact with the shanks of the core member and the outer member 45. The rib 34 on the upper surface of the core member flange 33 assists in this operation, since it aids in preventing the compressed casing between the flanges from flowing outwardly from the casing hole 35.

An important aspect of the compression step is that the core member and outer member are subjected only to longitudinal movement and that there is no relative rotation therebetween. Relative rotation must be avoided, since otherwise the curved flanges 33 and 46 would not be in parallelism after compression, and they would not compress the casing equally around the shank 31, thereby preventing an effective seal.

At the same time that the flanges are compressed together, the compression tool 57 will produce bend 47 in the shank 31, due to the fact that the compression member hole 105 becomes angularly inclined to the hole formed by grooves 91 and 92.

Since the amount of rocking movement of the compression member 95 is dependent solely upon the thickness of the wedging surface 110 of the lever arm 107, it is apparent that the amount of compression in each installation of a bypass insert will be the same to produce uniform results.

With the core member and outer member held in compressed position by the compression tool 57, the outer member is clamped onto the core member by a standard tool such as a "Nicopress" tool. Inasmuch as this is a standard tool, the details thereof have not been illustrated. "Nicopress" tools are made by The National Telephone Supply Co. of Cleveland, Ohio, and are described in U.S. Patent No. 2,086,400. For the purpose of this disclosure, it is sufficient to state that the jaws of such tool surround the outer member, and when the jaws are closed, it will squeeze the outer member, forming longitudinal wings 116 thereon, as best seen in FIG. 3, which has the result of decreasing the inner diameter of the outer member 45 so that it grips the shank 31 of the core member with great force.

With the outer member 45 clenched tightly to the core member 30, the compression tool 57 is unlocked and removed.

A retaining ring 50 is then slid onto the end of the bypass tubing 19, and the tubing is telescoped onto the exposed end of the shank 31. The ring 50 is then slid down on the tubing, past the bend 47 in the shank, and is positioned between the outer member 45 and the shank bend 47. The Nicopress tool is then used to clench the retaining ring 50 securely onto the tubing 19 by reducing the inner diameter of the ring, forming the excess metal into wings 117.

Since the tubing 19 is formed of resilient plastic, the retaining ring will not form as effective a mechanical connection as is formed between the outer member 45 and core member shank 31. However, the bend 47 in the shank will provide a mechanical lock for the retaining ring 50, since after the reduction in the inner diameter of ring 50 it can no longer slide past the bend in the shank without the application of a much greater force than will exist when the system is subjected to the intended superatmospheric pressure.

It may be desired in some instances to thread the end of shank 31 so that the bypass tubing 19 might be connected thereto by a standard nut connection. In such an event, the threaded end of shank 31 would have to be sufficiently spaced from the outer member 45 so that the threads are not damaged by the roughened grooves of compression tool 57.

It will be apparent from the above that the bypass connection described herein can be easily made in the field with the compression tool 57 described herein.

The pressure bypass connection is purely a mechanical connection, and may be put to use immediately. No heat is applied, as might be encountered in a vulcanizing process, and thus any damage that might be caused to the cable through heating is avoided. No solvents are used which might be injurious to the cable or the insulation of the wires within the cable, and of course the delay that would be encountered in waiting for solvents to set is avoided.

It is to be realized that the form of the compression tool that is illustrated and described herein is a preferred embodiment of the invention, and that various changes may be made in the shape, size and arrangement of the parts thereof without departing from the spirit of the invention or the scope of the attached claims.

Having thus described my invention, what I claim is:
1. A compression tool comprising:
   a pair of handle members, each having a top surface and a side surface,
   means pivotally connecting said handle members for movement of said side surfaces into and out of abutment with each other,
   said side surfaces each having a roughened groove extending from said top surfaces to form a hole through said handle members when said side surfaces are in abutment,
   means for locking said handle members together with said side surfaces in abutment with each other,
   an elongated compression member mounted on the top surface of one of said handle members for rocking engagement with said handle member about one end of said compression member,
   means for forcing the other end of said compression member from a first position adjacent said handle member to a second position away from said handle member, said compression member having a hole therethrough intermediate its ends, said compression member hole being in axial alignment with said handle members hole when said compression member is in its first position.

2. A compression tool as set forth in claim 1 and further including stop means for limiting the amount of movement of said other end of said compression member away from said handle member.

3. A compression tool comprising:

a pair of elongated handle members, each having a top and side surface adjacent one end thereof, means pivotally connecting said handle members at said one end thereof to enable said side surfaces to be moved into and out of abutment, said side surfaces each having a roughened groove extending from the top surface, said grooves forming a circular hole when said side surfaces are in abutment, means for locking said handle members together when said side surfaces are in abutment, an elongated compression member mounted on the top surface of one of said handle members, said compression member being in contact with said top surface adjacent each end of said compression member, said compression member having a sloping cam surface on one end thereof facing said top surface, said compression member having a hole therethrough intermediate its ends in axial alignment with the hole formed by said head portion when in abutment, said compression member hole having a cross-section longer than said head portions hole;

a lever arm rotatably mounted on one of said handle members, said arm having a wedge surface thereon movable between said compression member cam surface and said top surface adjacent thereto to rock said compression member on said top surface about the point of contact therebetween adjacent the other end of said compression member to move the holes in said compression member and said handle member away from each other and into angular relationship with each other.

4. In a tool as set forth in claim 3, and further including stop means on one of said handle members for limiting the rotation of said lever arm.

References Cited
UNITED STATES PATENTS

| | | | |
|---|---|---|---|
| 1,042,404 | 10/1912 | Coutant | 72—410 |
| 2,172,351 | 9/1939 | Kivley et al. | 72—409 |
| 2,440,040 | 4/1948 | Burton | 72—410 X |
| 2,732,744 | 1/1956 | Kuchman et al. | 72—409 X |

RICHARD J. HERBST, *Primary Examiner.*

E. SUTTON, *Assistant Examiner.*